Feb. 19, 1952 E. W. KROEGER ET AL 2,585,944
WORK HOLDING MEANS
Filed March 4, 1947 4 Sheets-Sheet 1

INVENTOR.
EDWARD W. KROEGER
BY JESSE DAUGHERTY
Joseph A. Rave
ATTORNEY

Feb. 19, 1952 E. W. KROEGER ET AL 2,585,944
WORK HOLDING MEANS
Filed March 4, 1947 4 Sheets-Sheet 2
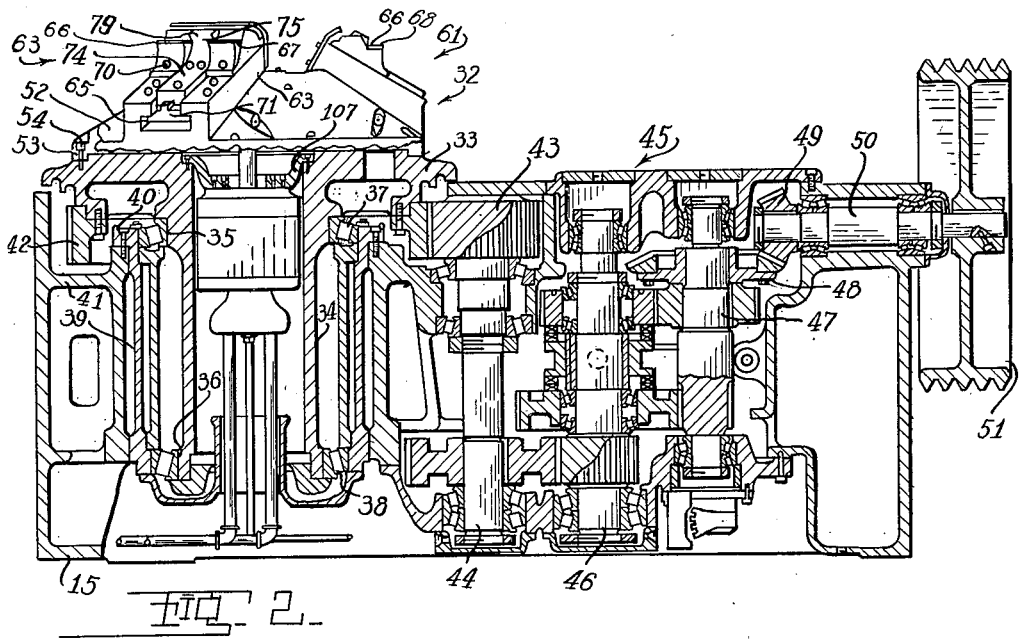
FIG. 2
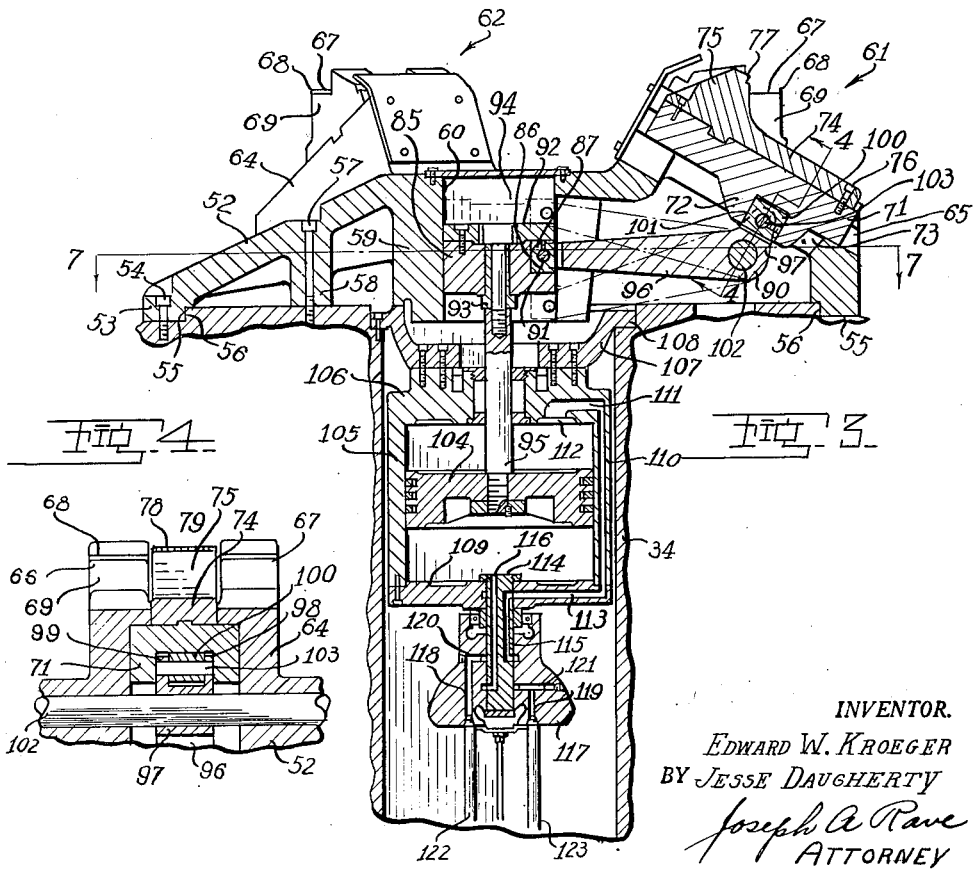
FIG. 3
FIG. 4
INVENTOR.
EDWARD W. KROEGER
BY JESSE DAUGHERTY
Joseph A. Rave
ATTORNEY

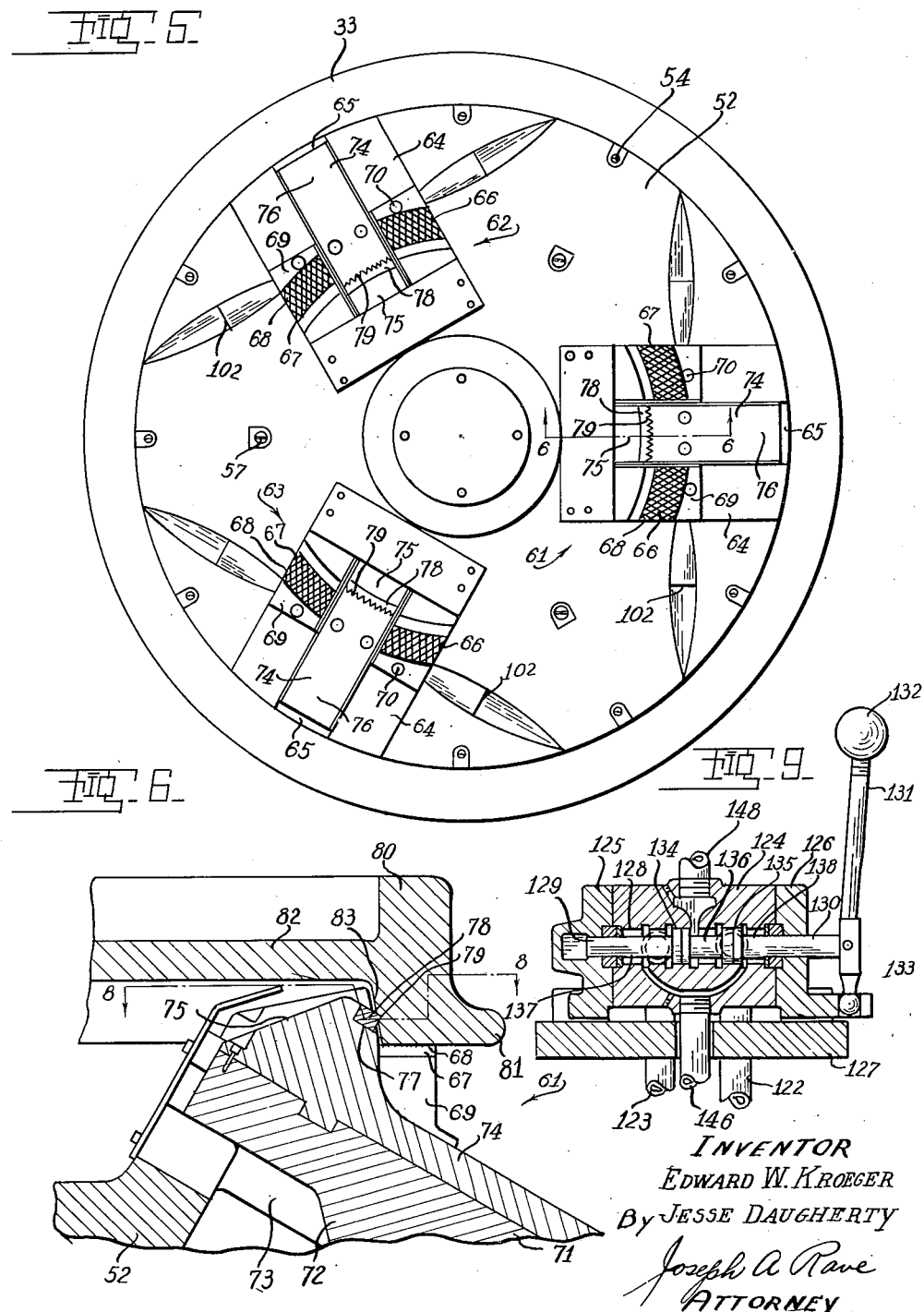

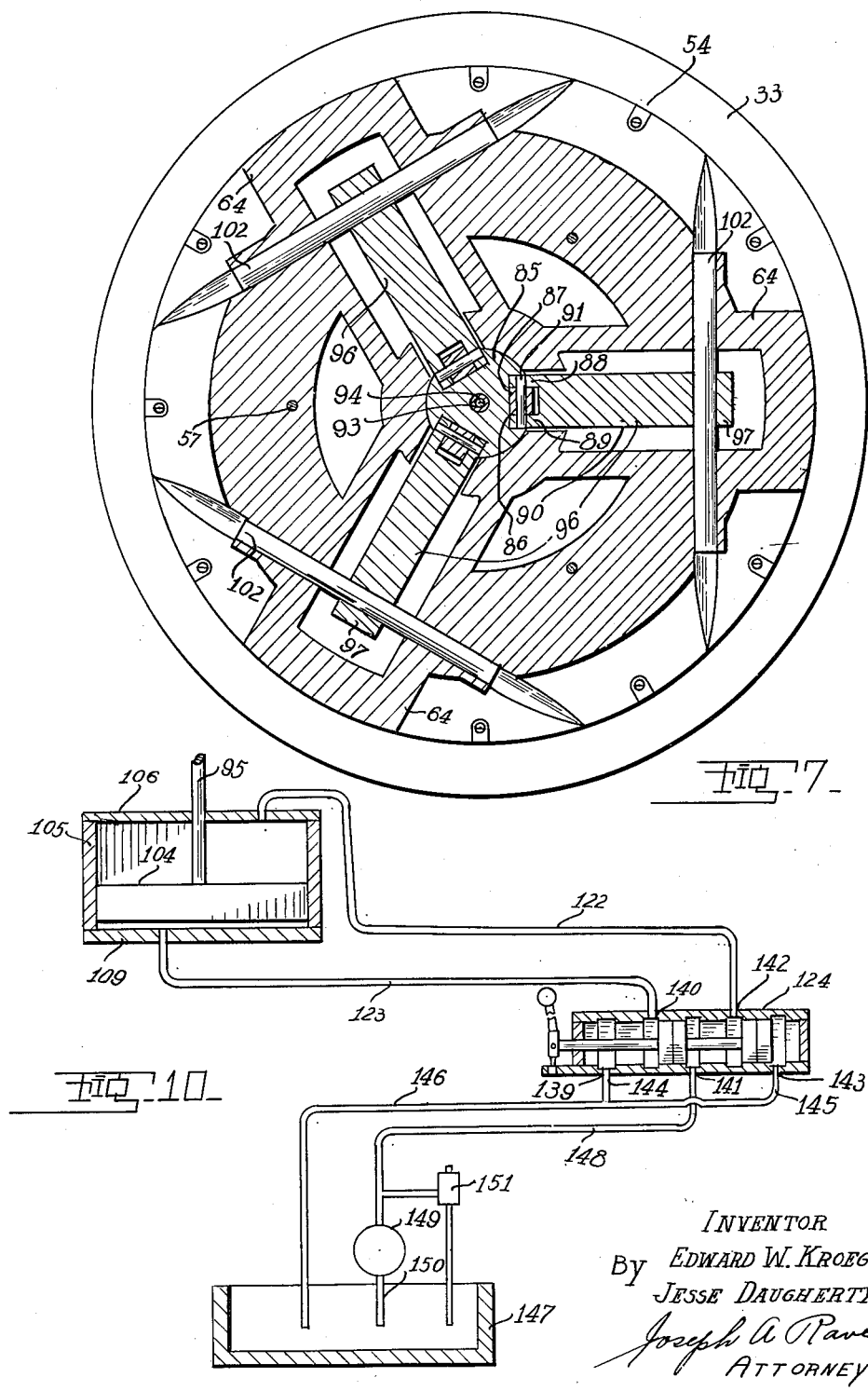

Patented Feb. 19, 1952

2,585,944

UNITED STATES PATENT OFFICE 2,585,944

WORK HOLDING MEANS

Edward W. Kroeger and Jesse Daugherty, Cincinnati, Ohio, assignors, by mesne assignments, to Giddings & Lewis Machine Tool Company, Fond du Lac, Wis., a corporation of Wisconsin Application March 4, 1947, Serial No. 732,172

9 Claims. (Cl. 279—4)

This invention relates to improvements in machine tools, particulary to work holding means, broadly termable a "chuck" for use in holding a work piece while being machined on a machine tool, for example, a boring mill.

In the past numerous attempts have been made to provide a work holding device or chuck for holding work pieces while being machined both internally and externally without rechucking or repositioning the work piece. These attempts have taken various forms in which the chucking or holding member or jaws had various movements to the axis of the work, but in each case they failed under certain cutting stresses or else were adaptable to holding the work piece during the internal machining boring, for example, and then had to be rechucked during the exterior machining, turning, for example. These prior chucks were used on work which had been previously partly machined as well as on what is termed, rough work such as castings, forgings and the like. These chucks or other work holding means when employed on partially machined work pieces were more successful than when used on rough work pieces.

By the present invention there is provided a work holding means or chuck for positioning and holding a work piece relative to the tools of a machine tool organization, so that the work piece may be machined both externally and internally in sequence or simultaneously, and without rechucking the work piece. Furthermore the work holding means or chuck of the present invention has equal application to the positioning and holding of finished work, semi-finished work or rough work, such as castings and forgings.

It is, therefore, the principal object of the present invention to provide a work holding means or chuck for adequately and positively positioning and holding a work piece to have performed thereon, sequentially or simultaneously internal and external or other machining operation.

Another object of the present invention is the provision of a work holding means or chuck for accomplishing the foregoing object that automatically centers the work with respect to the portion gripped by the chuck jaws so that the operations may be each concentric to one another.

A further object of the present invention is the provision of a rough casting or forging work piece positioning and holding means that is automatic in its operation and not only positions the work with respect to its axis of rotation but at the same time positions the work with respect to a backing or supporting face.

A still further object of the present invention is the provision of a rough casting work holding and positioning chuck that simultaneously centralizes the work with respect to the chuck and holds same in an operative position against movement in directions axially and laterally of the work axis.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 2 is a longitudinal sectional view through the machine of Fig. 1 showing the chuck and its drive as seen from line 2—2 on Fig. 1.

Fig. 3 is an enlarged sectional view through the chuck and its operating mechanism taken on a plane similar to that of Fig. 2 and which parts of Fig. 3 are shown in elevation in Fig. 2.

Fig. 4 is a transverse sectional view through a portion of Fig. 3 taken on line 4—4 on said Fig. 3.

Fig. 5 is a top plan view of the chuck of the present invention illustrating the same on an enlarged scale for clearness of illustration.

Fig. 6 is a fragmentary sectional view through one of the engaging or holding jaws as seen from line 6—6 on Fig. 5.

Fig. 7 is an enlarged sectional view through the chuck of the present invention taken on line 7—7 on Fig. 3.

Fig. 8 is a fragmentary sectional view in a horizontal plane through the clamping dog of the present invention as seen from line 8—8 on Fig. 6.

Fig. 9 is a longitudinal sectional view through the control valve for operating the chuck clamping members or dogs taken on line 9—9 on Fig. 1.

Fig. 10 is a diagrammatic view of the hydraulic circuit for operating the chuck clamping members or dogs.

Throughout the several views of the drawings similar reference characters are employed to denote the same or similar parts.

Figure 1:
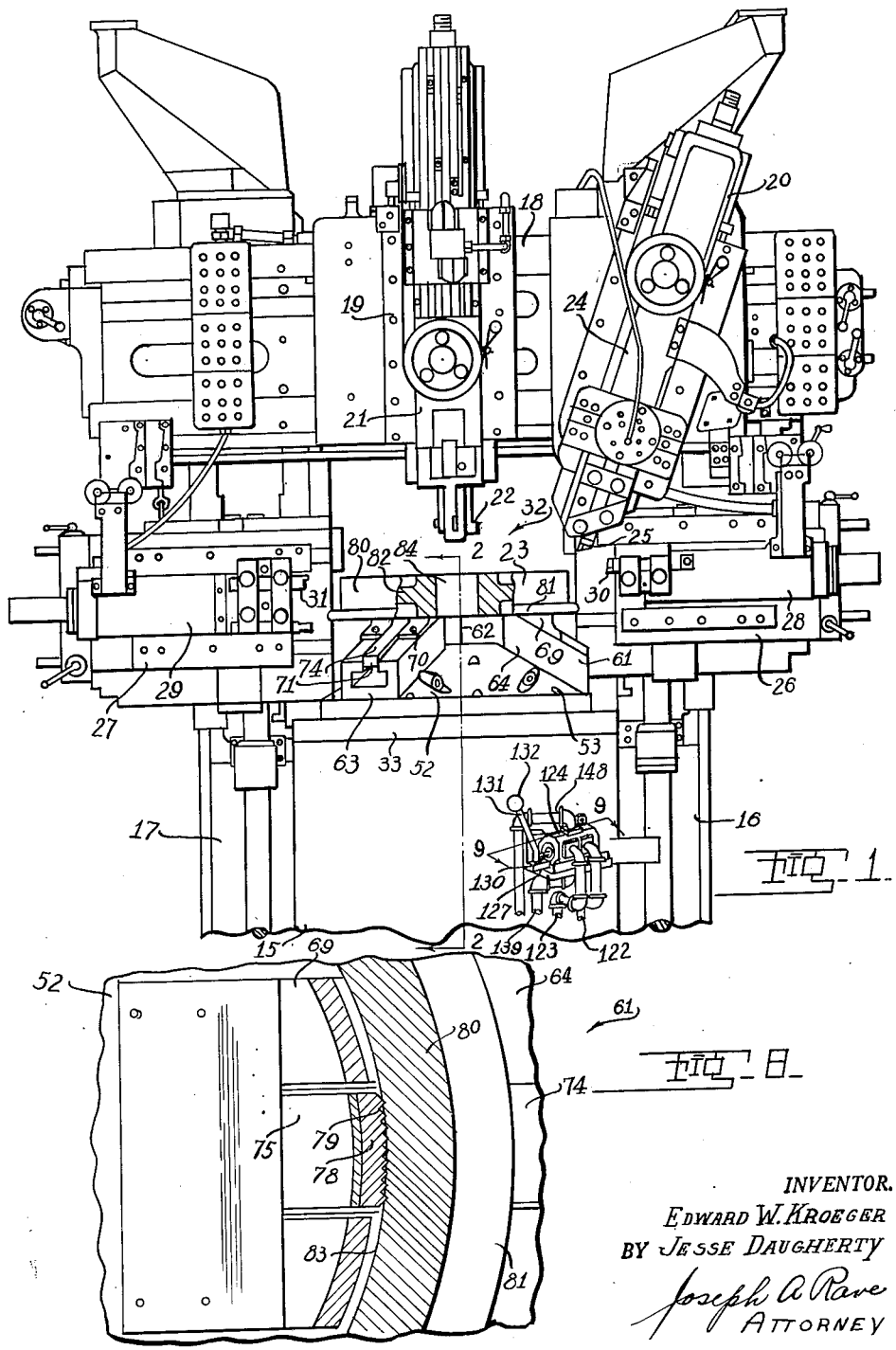
Fig. 1 is an elevational view of a machine tool, a boring mill, having associated therewith the improved work holding means or chuck of the present invention.

As intimated above the work holding means or chuck of the present invention was designed for use on a boring mill and is so illustrated in the drawings, but, it is to be understood, that it is not limited to this specific type or kind of machine tool as it has application to any machine tool for holding work on a table, or other work support, while the work is being subjected to the action of cutting tools, and whether the work is rotated relative to the tools or the tools rotated relative to the work, or neither rotated but merely moved relative to one another. Furthermore and as will later be made clear the chuck was designed and is illustrated as holding rough, unfinished, work pieces, such for example, a car wheel and while specific reference will be made to a car wheel the chuck's use is not limited thereto. As is well known the holding of a car wheel is one of the most difficult uses to which a chuck can be put and it should be noted that the chuck of the present invention has successfully positioned and held car wheels while being machined both interiorly and exteriorly.

Specifically, and referring to the drawings, the boring mill illustrated comprises a bed 15 flanked at diametrically opposite points by uprights 16 and 17 which are joined at their upper ends by a rail 18. The rail 18 is adapted to be fastened or bolted to the uprights 16 and 17 and has mounted thereon tool heads 19 and 20. The tool head 19 includes a ram 21 carrying boring tools or bits 22 for internally machining or boring the work piece 23. The work piece 23 as intimated above, is a car wheel as utilized or employed on railroad cars, both passenger and freight, electric street cars and similar vehicles.

The tool head 20, similar to the tool head 19, has associated therewith a ram 24 carrying turning or finishing tools or bits 25 adapted for operation on the upper face of the work piece or car wheel 23. Each of the rams 21 and 24 is operable through suitable motor driven mechanisms not shown or deemed necessary to the complete understanding of the present invention.

Mounted, respectively, on the uprights 16 and 17 is a tool head 26 and 27 each of which has, respectively, associated therewith a ram 28 and 29 carrying tools or bits 30 and 31 for operation on the tread or tire of the wheel 23 and the flange at the inner end of said tire or tread. The rams 28 and 29 similar to the rams 21 and 24 are each actuated relative to their supporting heads by suitable motor driven means not shown or deemed necessary to be shown in order to completely understand the present invention.

The work piece or car wheel 23 is secured in position by the chuck of the present invention indicated in its entirety by the reference numeral 32 which is secured to a rotating work supporting table 33. The work supporting table 33 has depending centrally thereof a sleeve like member 34 provided near its upper end with a radial anti-friction bearing face 35 and near its lower end with a similar radial anti-friction bearing face 36. Mounted on each of said bearing surfaces is an anti-friction radial roller bearing 37 and 38 which have their outer races received in a sleeve 39 secured by bolts extending through a radial flange 40 thereof to the bed 15. The attachment of the bed sleeve 39 to the bed 15 is by way of a web or flange 41 internally projecting from the bed wall.

The work supporting table 33 is rotatable through a ring gear 42 bolted or otherwise secured to a depending flange of the table 33 and the gear 42 meshes with a pinion 43 integral with, or secured to, the final driven shaft 44 of a change speed gear box, indicated in general by the reference numeral 45.

The gear box 45 in addition to the final driven shaft 44 includes intermediate shaft 46 and initial driven shaft 47. Mounted on said shafts 44, 46 and 47 are various fixed and shiftable gears or clutches whereby various gear ratios are established between them to effect a variable speed of rotation in the final driven shaft 44 and table 33. The initial driven shaft 47 has keyed or otherwise fixed thereto a bevel gear 48 enmeshed with a bevel driving pinion 49 keyed or otherwise secured to a driving shaft 50. The driving shaft 50 is suitably journaled in the gear box 45 and has a portion thereof projecting exteriorly to receive a driving pulley 51 illustrated in the drawings as of multiple V type.

From the foregoing it will be noted that the work supporting table 33 is adapted to be rotated about its axis through a change speed gear box and it is to be understood the gear box may be of the kind specifically disclosed in the present drawings or of any other kind usually employed with machine tools.

As was noted above the work positioning and rotating chuck 32 is secured to the work supporting table 33 and for this purpose the chuck 32 comprises a body portion 52 having around its perimeter a plurality of countersunk portions or lugs 53 through which pass fastening screws or bolts 54. In order to accurately position the chuck body 52 on the work table 33 the said chuck body 52 is provided with a counter bore 55 receiving an upstanding portion 56 from the table 33. To further secure the chuck body 52 to the table 33 use is made of a plurality of screws or bolts 57 located nearer the center of the said chuck body 52, and which screws or bolts 57 pass through the lugs 58 inwardly of the chuck body 52, from which it will be appreciated that the chuck body is substantially hollow.

The chuck body 52 is substantially conical in cross-section having its upper end flattened and is provided centrally thereof with a sleeve 59 substantially centrally bored as at 60. Equally positioned around the axis of the chuck body 52 are a plurality of work supporting seats and work clamping jaws, there preferably being three such mechanisms, as illustrated in the drawings and respectively indicated by reference numerals 61, 62 and 63. Each of the work supports and clamping jaws is substantially identical with the others wherefore it is deemed sufficient if but one of them be described in detail.

Accordingly, work supporting and clamping mechanism 61 is provided with an upstanding boss or lug 64 formed integral with the chuck body 52 and which upstanding boss or lug 64 is provided with a T slot 65. The bearing surface of the T slot 65 is at an oblique angle to the axis of the chuck wherefor it extends outwardly and dwonwardly with respect to said chuck axis. The portion of the upstanding boss or lug 64 located on each side of the T slot or passageway 65 is respectively provided, at its upper end, with a supporting surface of face 66 and 67. These supporting surfaces 66 and 67 are each in the form of a hardened plate 68 suitably knurled to provide points or teeth to properly support the work, car wheel, placed thereon. The said plates 68 are each screwed or otherwise secured to a block 69 fastened by means of screws or bolts 70 to the upstanding boss or lug portion 64. The supporting blocks 69 are so designed that the plates 68 and their surfaces or faces lie in a plane at right angles to the axis of the chuck and at an obtuse angle to the angle of inclination of the bearing surface of the T slot 65.

Received in the T slot 65 is a slide 71 provided intermediate of its ends with a depending lug 72 which projects through a recess or opening 73 formed in the chuck enlargement 64 and which aperture 73 projects through one end of the enlargement whereby the slide is mounted in operative position. Secured to the slide 71 is the clamping jaw proper which includes a body portion 74 having an upstanding lug or boss 75 at the upper or inner end thereof. The jaw proper 74 is secured to the slide 71 in any suitable or desirable manner such for example as by bolts or screws 76. The jaw lug or boss 75 is provided at its upper end with an angular seat 77 in which is adequately secured, as by welding, jaw gripping teeth 78. The said jaw gripping teeth 78 are formed from one or more pieces of hard material such for example as tungsten carbide. The said strips or pieces 78 are provided at their outer ends with teeth 79, see Fig. 8 and which teeth are formed to be quite sharp in the nature of saw teeth or the like.

The slide 71 together with its jaw 74 is adapted to be actuated relative to the T slot 65 and any suitable or desirable means may be employed for effecting this movement of the jaws. It should be here noted that the angular direction of movement of the slide 71 is such that the jaw teeth 79 in the strip or strips 78 move toward the supporting surfaces 66 and 67 of the work supporting plates 68 and at the same time move across or laterally of said plates. By this construction the work engaging or gripping teeth 79 not only position the car wheel around the axis of the chuck but at the same time tend and do exert a downward movement of and seating pressure on the work supporting plate surfaces 66 and 67. Since the work after being centralized by the several chucking jaws 74 cannot move radially of the axis of the chuck and cannot move below the surfaces 66 and 67 the jaw teeth 79 bite or dig into the work in the manner clearly illustrated in Fig. 8. By this construction the work is adequately and positively held for rotation while being operated upon by the tools above referred to.

As was noted above this chuck will find its important use in connection with ring type work such as car wheels which, as seen in Fig. 6, comprises a rim 80 having at one end thereof and projecting radially of the axis of the car wheel, a bead or flange 81 with said car wheel having a web 82 substantially centrally of the height of the wheel rim and which web 82, at substantially its center, carries the wheel hub 84. The dog teeth 79 are adapted to engage and bite into the portion of the car wheel rim 80 located on the under side of the web 82 and which portion of the car wheel is indicated by the reference numeral 83.

By mounting the car wheel as just described the back side of the wheel is used for supporting it with the face or front side the hub 84 and the wheel rim 80 exposed whereby the hub may be bored and at the same time the face of the hub can be turned or faced. Without shifting the car wheel the face of the rim 80 may likewise be turned or faced as may the periphery or tread of the tire which extends from the face side of the rim 80 to the bead or flange 81. Simultaneously or consecutively with the turning of the wheel tire the bead or flange 81 may be turned as can the fillet between the said bead or flange 81 and the tread of the rim 80. Each of these operations has been successfully performed on the machine illustrated in Fig. 1 and the performance of such operations is due primarily to the chuck heretofore described since the chuck jaws 74 are so operated with respect to the chuck body and the work or car wheel mounted thereon as to adequately and completely grip the said wheel.

The specific means illustrated in the drawings for actuating the jaw slide 71 and the parts connected therewith comprises a reciprocating member or head 85 which is provided at its upper end with recesses 86 there being as many recesses as ther are clamping jaws, in each of which is mounted a block 87 that is received between the fingers 88 and 89 of the jaw slide actuating bell crank 90. The block 87 is connected with the fingers 88 and 89 by means of a pivot or trunnion 91. Each of the blocks 87 is retained in its recess by a plate 92 bolted or otherwise secured to the upper surface of the head 85.

The head 85 is mounted on a sleeve or bushing 93 which is secured through a bolt or screw 94 to one end of a piston rod 95.

As will later be made clear the piston rod 95 is axially shifted which through the head 85 and its plate 92 effects a vertical movement of the blocks 87. The bell crank 90 includes a long arm 96 and a short arm 97. It is the long arm 96 that has one end bifurcated for providing the fingers 88 and 89 for the block 87 and the short arm 97 is similarly bifurcated to provide fingers 98 and 99 receiving between them a slide block 100. The slide block 100 is received in a slide way 101 formed in the downwardly projecting lug 72 of the jaw slide 71. The bell crank 90 at the junction of its arms 96 and 97 is pivotally mounted on a pin, stud, shaft or the like 102 which is carried by the chuck body member 52. It should be noted that each of the slide blocks 87 and 100 is secured to its pivot pin 91 and 103 wherefore, and as will later be made clear, the slide blocks move with their respective arms 96 and 97 while oscillating relative to the head 85 and slide 71. It should be noted that the recesses 86 and 101 are formed to such dimensions as to permit the sliding movement of the blocks relative thereto.

As indicated in Fig. 3 the head 85 has a stroke of considerable length between its fully unclamped position and its fully clamped position for the maximum size of work piece that can be accommodated by the chuck illustrated in the drawings. It will further be appreciated that due to the difference in lengths of the long arm 96 and the short arm 97 a considerable force will be exerted at the end of the short arm 97 even though the actual movement of the short arm 97 is quite small compared to that of the long arm 96 wherefore the dog teeth 79 can be driven into the work for effectively gripping and holding the same.

In order to effect the operation of the head 85, and thereby the dogs 75, piston rod 95 is secured to a piston 104 disposed within a cylinder 105 which is conveniently located within the bed sleeve 36 with said cylinder 105 having its one head 106 suitably bolted to a bracket 107 which is substantially dish shaped and provided at its upper end with a radial flange 108 secured by screws or the like to the bed 15 at the upper end of the bed sleeve 34. It will be readily understood that the actual mounting of the cylinder 105 may take any suitable or desirable form and not necessarily limited to the specific disclosure in the drawings.

The other end of the cylinder 105 is closed by a cylinder head 109. For convenience the cylinder 105 is provided longitudinally through a portion of the cylinder wall with a port or duct 110 which communicates with a transverse port or duct 111 in the cylinder head 106, the latter terminating in a port 112 communicating with the upper end of the cylinder 105. The other end of the port or duct 110 is adapted to be aligned with a transverse port or duct 113 in the removable head 109 and projecting therebelow is a sleeve provided longitudinally thereof with ports or ducts 115 and 116. The port or duct 115 terminates short of the inner end of the sleeve 114 so as to have communication with the port or duct 113 in the cylinder head 109. The other longitudinal port or duct 116 through the sleeve 114 projects through the said inner end of said sleeve 114 to communicate with the cylinder 105 at the end thereof closed by the removable cylinder head 109.

Carried by the sleeve 114 is a connector 117 which is provided with a pair of ports 118 and 119 which extend into the connector from one end thereof with the port 118 communicating at its inner end with a transverse port 120 and the inner end of the port 115 and therefore the upper end of cylinder 105. The port 119 likewise has its inner end terminating in a transverse port 121 which connects with the inner end of port 116 and therefore the lower end of the cylinder 105.

The said connector member ports 118 and 119 each terminate at the outer or lower extremity of said connector to have screwed thereinto, respectively, pipes or conduits 122 and 123. The pipes 122 and 123 each terminate at their other end in a valve mechanism for directing an hydraulic medium to the cylinder 105 and thereby actuate the piston 104.

The valve mechanism is shown structurally in Figs. 1 and 9, and as there shown comprises a body member 124 closed at its opposite ends by end plates 125 and 126. In order to mount the valve in position the body member 124 and end plates 125 and 126 are secured to one another and mounted on a suitable bracket 127 secured to and carried by the bed 15 at a point near its front end so as to be within reach of the machine operator.

The valve body 124 is provided centrally with a bore 128 in which is mounted a spool type valve 129 which has projecting from one end thereof the valve stem 130 operatively connected with operating lever or handle 131. As shown in the drawings the handle 131 is provided at one end with a knob 132 and at its other end with a ball 133 conveniently received in a ball socket in a portion or extension of the valve and plate 125. It will be understood that the spool valve 129 is shifted through the handle 131 for alternatively connecting the hydraulic pressure medium with the pipes or conduits 122 and 123.

In order to alternately direct the said hydraulic medium to the pipes or conduits 122 and 123 the spool valve 129 is provided intermediate its end with enlarged portions or spools 134 and 135 thereby providing a reduced portion 136 between said spools and a further reduced portion 137 beyond the spool 134 as well as a reduced portion 138 beyond the spool 135 and between itself and the valve stem 130.

The foregoing description of the valve is of a commercially known product and not new, per se, with the present invention. In Fig. 10 the said valve is diagramatically illustrated along with the various pipes or conduits connected therewith and the mechanism for supplying the said hydraulic medium under pressure and it is deemed for purposes of clearance that the operation of the hydraulic mechanism will be understood from a description of Fig. 10.

Accordingly, and as illustrated in Fig. 10, the valve body 124 is provided with a plurality of ports 139, 140, 141, 142 and 143. It is with the ports 140 and 142 that the pipes or conduits 123 and 122 are respectively connected. The ports 139 and 143 have each connected therewith one end of a pipe or conduit 144 and 145 which are each connected into the exhaust or return pipe or conduit 146 that has its other end terminating in a sump or tank 147. The remaining port 141 has connected with it at one end a pipe or conduit 148 the other end of which is connected with a power driven pump 149. The pump has its intake connected by a pipe or conduit 150 with the sump or tank 147. The pipe or conduit 148 has connected therewith, at a point intermediate the valve 124 and pump 149, a pressure determinating mechanism 151, which, as is well known, comprises an adjustable relief valve to determine the operating pressure in the pipe or conduit 148.

It is believed that the operation of this mechanism is obvious from Fig. 10 and the foregoing description since with the spool valve 129 in the position illustrated in Fig. 10 the pressure in pressure pipe or conduit 148 is connected with the upper end of the cylinder 105 thereby actuating the piston 104 downwardly to cause the retraction of the chuck jaws. At this time the other end of the cylinder 105 is connected through the pipe or conduit 123 and spool valve 129 with exhaust pipes or conduits 144 and 146 and the sump or tank 147 for returning the hydraulic medium to the said sump or tank. It will be understood that shifting of the spool valve 129 to the opposite position from that illustrated in Fig. 10 will connect the hydraulic medium or pressure in the pipe or conduit 148 with the pipe or conduit 123 and the lower end of the cylinder 105 and thereby cause an upward movement of the piston 104 in the cylinder 105 and an outward and downward shifting of the jaw slides 74 and their jaws 75 for engaging the work as above set forth.

In view of the foregoing description of the mechanism involved in the chuck or work holding means of the present invention, it is believed obvious that there has been provided a work holding device that will accomplish each of the objects initially set forth.

What is claimed is:

1. In a device of the class described, the combination of a body member, a plurality of work supports on said body member radially and angularly spaced from and around the axis of the body member, a clamping jaw carried by the body member in operative relation to each of the work supports, means mounting at least one of said jaws for movement through a path angularly related to the axis of the body member and to the plane of its work support so that said clamping jaw actuates the work against the work supports, means including an oscillatory fulcrumed lever having one of its ends connected with the angularly movable jaw for oscillating the lever in one direction and angularly sliding the jaw for engaging the work, and gripping means on said angularly movable jaw penetrating the surface of the work for clamping same between the gripping means and the work supports.

2. In a device of the class described, a body member, a plurality of work supports on said body member angularly spaced about the axis of the body member and lying in a plane substantially normal to the axis of the body member, a clamping jaw associated with each work support with said clamping jaws mounted on the body member for movement through planes angularly related to the axis of the body member and to the plane of the work supports, gripping means capable of surface penetration on each of said jaws normally above the work supports and movable toward and across said work supports, and means for actuating said jaws and their gripping means with such force to cause the gripping means to penetrate the work below the surface and clamp same between the said gripping means of each clamping jaw and its work support.

3. In a device of the class described, a body member, a plurality of work supports on said body member angularly spaced about the axis of the body member and lying in a plane substantially normal to the axis of the body member, a clamping jaw associated with each work support with said clamping jaws mounted on the body member for movement through a plane angularly related to the axis of the body member and to the plane of the work supports, gripping means capable of surface penetration on said jaws normally above the work supports and movable toward and across said work supports, and means for actuating said jaws and their gripping means with such force to cause the gripping means to penetrate the work below the surface and clamp same between the said gripping means of each clamping jaw and its work support, including an oscillatable lever carried by the body member for each clamping jaw.

4. In a device of the class described, a body member, a plurality of work supports angularly spaced on said body member about the axis thereof with said supports in a plane substantially normal to the body member axis, a clamping jaw associated with each work support, means on said body member for supporting said clamping jaws for movement through planes angularly related to the body member axis and to the plane of the work supports, an oscillatable bell crank having a short arm and a long arm for each jaw with said bell cranks each having the short arm connected to its jaw, means centrally of the body member operatively connected with the long arm of each bell crank for simultaneously oscillating the same whereby the jaws are simultaneously operated to centralize the work on the work supports relative to the body member prior to the clamping thereof, and surface piercing teeth on each jaw for digging or biting into the work to effect a clamping operation with said biting or digging teeth penetrating the work appreciably below the surface thereof and effecting a clamping of the work on the work supports.

5. In a device of the class described, a body member, a plurality of work supports angularly spaced on said body member about the axis thereof with said supports in a plane substantially normal to the body member axis, a clamping jaw associated with each work support, means on said body member for supporting said jaws for movement through planes angularly related to the body member axis and to the plane of the work supports, an oscillatable bell crank having a long arm and a short arm for each jaw with said bell cranks each having the short arm connected to its jaw, means centrally of the body member operatively connected with the long arm of each bell crank for simultaneously oscillating the same whereby the jaws are simultaneously operated to centralize the work on the work supports relative to the body member axis prior to the clamping thereof, clamping means on each jaw adapted to penetrate below the surface of the work in effecting its clamping on the work supports, and means beyond the body member for operating the bell cranks oscillating means to cause the jaws clamping means to penetrate below the surface of the work.

6. In a device of the class described, a body member, a plurality of work supports angularly spaced on said body member about the axis thereof with said supports in a plane substantially normal to the body member axis, a clamping jaw associated with each work support, means on said body member for supporting said jaws for movement through planes angularly related to the body member axis and to the plane of the work supports, a fulcrumed bell crank having a short and a long arm for each jaw with said bell cranks each having the short arm connected to its jaw, means centrally of the body member operatively connected with the long arm of each bell crank for simultaneously oscillating the same whereby the jaws are simultaneously operated to centralize the work on the work supports relative to the body member axis prior to the clamping thereof, clamping means on each jaw adapted to penetrate below the surface of the work in effecting its clamping on the work supports and means beyond the body member for operating the bell cranks oscillating means, comprising a piston and cylinder mechanism including a piston and cylinder one of which is operatively connected with the said bell cranks oscillating means.

7. In a device of the class described, a support having a supporting surface for a ring like work piece, a moveable jaw adjacent the support and moveable through a plane angularly related to the plane of the work supporting surface, said jaw being adapted to be located interiorly of the work and adapted during its movement through its inclined plane of movement to engage the inner surface of the work, means including a fulcrumed lever having a short portion connected with the jaw and a long portion for effecting the said jaw movement, and means carried by said jaw for biting or digging into the work to a point appreciably below the surface of the work for clamping the work between the biting or digging means and the work support.

8. In a device of the class described, a support having a supporting surface for a ring like work piece, a moveable jaw adjacent the support and moveable through a plane angularly related to the plane of the work supporting surface, said jaw being located interiorly of the work and adapted during its movement through its inclined plane of movement to engage the inner surface of the work, means including a fulcrumed lever having a short portion connected with the jaw and a long portion for effecting the said jaw movement, means carried by said jaw for biting or digging into the work to a point appreciably below the surface of the work for clamping the work between the biting or digging means and the work support, and hydraulic means connected with the lever long portion for effecting the oscillation of the lever for exerting on the jaw sufficient force to cause the biting or digging means thereof to penetrate the surface of the work.

9. In a work holding chuck of the class described, a body member, work supporting means on said body member and including a plurality of work supports distributed angularly about the axis thereof and lying in a plane substantially normal to said axis, a plurality of clamping jaws distributed around said axis and being associated respectively with said work supports, gripping means on said jaws capable of surface penetration into the work and normally positioned above said work supports, means mounting said individual jaws on said body member for movement of said gripping means in a direction having a radially outward component and a component directed toward said work supports, and means for actuating said jaws and gripping means with such force as to cause said gripping means to penetrate the work substantially beneath the inside surface thereof and to clamp the work between said gripping means and said work supports.

EDWARD W. KROEGER.
JESSE DAUGHERTY.

REFERENCES CITED

The following references are of record in the file of this patent:

UNITED STATES PATENTS

| Number | Name | Date |
| --- | --- | --- |
| 1,146,193 | Miller | July 13, 1915 |
| 1,366,003 | Iggberg | Jan. 18, 1921 |
| 1,531,327 | Wood et al. | Mar. 31, 1925 |
| 1,900,934 | Hudson | Mar. 14, 1933 |
| 2,025,885 | Nenninger et al. | Dec. 31, 1935 |